(12) United States Patent
Yeung et al.

(10) Patent No.: US 7,587,045 B2
(45) Date of Patent: Sep. 8, 2009

(54) SYSTEM AND METHOD FOR SECURING DOCUMENT TRANSMITTAL

(75) Inventors: Michael Yeung, Mission Viejo, CA (US); Sameer Yami, Irvine, CA (US); Amir Shahindoust, Laguna Niguel, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 742 days.

(21) Appl. No.: 11/242,235

(22) Filed: Oct. 3, 2005

(65) Prior Publication Data

US 2007/0076867 A1 Apr. 5, 2007

(51) Int. Cl.
H04L 9/30 (2006.01)
H04L 9/00 (2006.01)
H04L 9/32 (2006.01)
G06F 11/30 (2006.01)

(52) U.S. Cl. .............................. 380/43; 380/30; 380/44; 713/171; 713/189

(58) Field of Classification Search ......... 380/200–286, 380/42–43, 44–47, 51–55; 713/171, 189
See application file for complete search history.

(56) References Cited

U.S. PATENT DOCUMENTS

| | | | | |
|---|---|---|---|---|
| 4,881,263 | A * | 11/1989 | Herbison et al. | 713/162 |
| 5,418,854 | A * | 5/1995 | Kaufman et al. | 713/156 |
| 5,675,649 | A * | 10/1997 | Brennan et al. | 380/286 |
| 6,530,022 | B1 | 3/2003 | Blair et al. | |
| 6,665,709 | B1 | 12/2003 | Barron | |
| 6,675,153 | B1 | 1/2004 | Cook et al. | |
| 6,775,772 | B1 | 8/2004 | Binding et al. | |
| 6,886,095 | B1 | 4/2005 | Hind et al. | |
| 6,988,199 | B2 * | 1/2006 | Toh et al. | 713/170 |
| 7,089,417 | B2 * | 8/2006 | Wack et al. | 713/162 |
| 7,181,016 | B2 * | 2/2007 | Cross et al. | 380/281 |
| 7,477,748 | B2 * | 1/2009 | Schmidt | 380/279 |
| 2002/0007454 | A1 | 1/2002 | Tarpenning et al. | |
| 2002/0152175 | A1 | 10/2002 | Armstrong et al. | |
| 2003/0028761 | A1 | 2/2003 | Platt | |
| 2003/0041269 | A1 * | 2/2003 | Kurishita et al. | 713/201 |
| 2003/0101346 | A1 * | 5/2003 | Barron et al. | 713/175 |
| 2003/0188156 | A1 | 10/2003 | Yasala et al. | |
| 2003/0225699 | A1 | 12/2003 | Stefik et al. | |

(Continued)

OTHER PUBLICATIONS

Alfred J. Menezes, Applied cryptography, 1997, CRC press LLC, pp. 524-528.*

Primary Examiner—Emmanuel L Moise
Assistant Examiner—Abu Sholeman
(74) Attorney, Agent, or Firm—Tucker Ellis & West LLP

(57) ABSTRACT

The present invention is directed to a system and method for secure transmission of electronic document data on a network. The method begins with the receipt of user identification data associated with the identity of a user of document processing devices on the associated network. A password key, composed of a first share and a second share, is then generated from the user identification data. The first share is then communicated to an associated storage area. Electronic document data is then received, and an encryption key is randomly generated. The electronic document data is then encrypted using the encryption key. The second share is then appended to the encrypted electronic document and the combined data is communicated to an associated document processing device.

12 Claims, 4 Drawing Sheets

U.S. PATENT DOCUMENTS

| | | |
|---|---|---|
| 2003/0233549 A1 | 12/2003 | Hatakeyama et al. |
| 2005/0002532 A1* | 1/2005 | Zhou et al. .................. 380/277 |
| 2005/0154873 A1 | 7/2005 | Cam-Winget et al. |
| 2005/0154889 A1 | 7/2005 | Ashley et al. |
| 2006/0177059 A1* | 8/2006 | Tanaka ....................... 380/243 |

* cited by examiner

SYSTEM AND METHOD FOR SECURING DOCUMENT TRANSMITTAL

BACKGROUND OF THE INVENTION

This invention is directed to a method and system for adding data encryption services to a document processing device. More particularly, this invention is directed to a method and system for encrypting and decrypting image data transmitted from a client device to a document processing device over a computer network.

In a conventional office setting, document processing devices, such as printers, copiers, facsimile machines, and scanning devices typically include little to no inherent data security. For example, an individual with physical access to the device will generally have little difficulty in accessing the files being printed, faxed, or stored on the document processing devices. Irrespective of whether the network in question is a corporate network, or an external wide area network, document data is transmitted to document processing devices in plain text format, i.e., no encryption methods employed. Various attempts to encrypt document data for security purposes have been undertaken. For example, some document processing devices encrypt the data, but then require user intervention, such as a password, fingerprint, smart card, and the like, to identify the owner of the data. Furthermore, login and password protection protect the document from access by unauthorized personnel, but do little to protect the document from access by an employee with rights to use the document processing device, but lacking the authorization to view certain documents. This technique for incorporating encryption/decryption in document processing operations is time-consuming.

The subject invention overcomes the aforementioned problems and provides a method and system for encrypting and decrypting document data by a document processing device.

SUMMARY OF THE INVENTION

In accordance with the present invention, there is provided a system and method for the secure transmission of electronic document data on a network.

Further in accordance with the present invention, there is provided a system and method for encrypting and decrypting electronic document data for secure transmission on a network Still further, in accordance with the present invention, there is provided a system and method for encrypting electronic document data for secure transmission to a document processing device, wherein the document processing device decrypts the electronic document data and outputs the electronic document in accordance with user provided instructions.

In accordance with the present invention, there is provided a system for secure transmission of electronic document data on a network. The system includes receiving means adapted to receive user identification data associated with the identity of the user of document processing devices on an associated network. Password key generating means are then employed to generate password key data from the user identification data. The password key generated includes two shares, a first share and a second share. The system further includes communication means adapted to communicate the first share to an associated storage area. The system also includes receiving means adapted to receive data representing an electronic document. The system further contains encryption key generator means adapted to randomly generate an encryption key. Encryption means are also included, which encrypt the electronic document data in accordance with the encryption key to generate an encrypted electronic document. Appending means adapted to append the second share to the encrypted electronic document are also used by the present system. The system also contains communication means adapted to communicate the encrypted electronic document and the appended second share to an associated document processing device.

In one embodiment, the system further includes receiving means adapted to receive the encrypted document and appended second share into the associated document processing device. This embodiment further includes receiving means adapted to receive the first share from the associated storage area and generating means adapted to generate a password key from the first and second shares. The system of the this particular embodiment further includes decrypting means adapted to decrypt the encrypted document in connection with the password key and commencement means adapted to commence a document processing operation on the decrypted electronic document.

Further, in accordance with the present invention, there is provided a method for the secure transmission of electronic document data on a network. The method begins with the receipt of user identification data associated with the identity of a user of document processing devices on the associated network. A password key, composed of a first share and a second share, is then generated from the user identification data. The first share is then communicated to an associated storage area. Electronic document data is then received, and an encryption key is generated randomly. The electronic document data is then encrypted using the encryption key. The second share is then appended to the encrypted electronic document and the combined data is communicated to an associated document processing device.

In one embodiment, the method further includes the steps of receiving the encrypted electronic document and the appended second share into the associated document processing device and receiving the first share from the associated storage area. The method of this embodiment further includes the steps of generating a password key from the first and second shares, and decrypting the encrypted electronic document in connection with the password key. The method also includes the step of commencing a document processing operation on a decrypted electronic document.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain parts, and arrangements to parts, which are evidenced in conjunction with the associated drawings, which form a part hereof and not, for the purposes of limiting the same in which.

DETAILED DESCRIPTION OF THE PREFERRED EMBODIMENT

This invention is directed to a system and method for encrypting and decrypting image data using secure encryption/decryption keys. In particular, the present invention is directed to a system and method for encrypting and decrypting image data on a network using a secure method for generating keys and encryption/decryption management without direct user intervention. More particularly, the present invention is directed to a system and method for encrypting and decrypting electronic documents transmitted to or stored on a document processing device. In the preferred embodiment, as described herein, the document processing device is suitably an image generating device. Preferably, the image generating device is a multifunctional peripheral device, capable of providing scanning, copying, facsimile, printing, document management, document storage, electronic mail, and other functions to a user.

Figure 1:
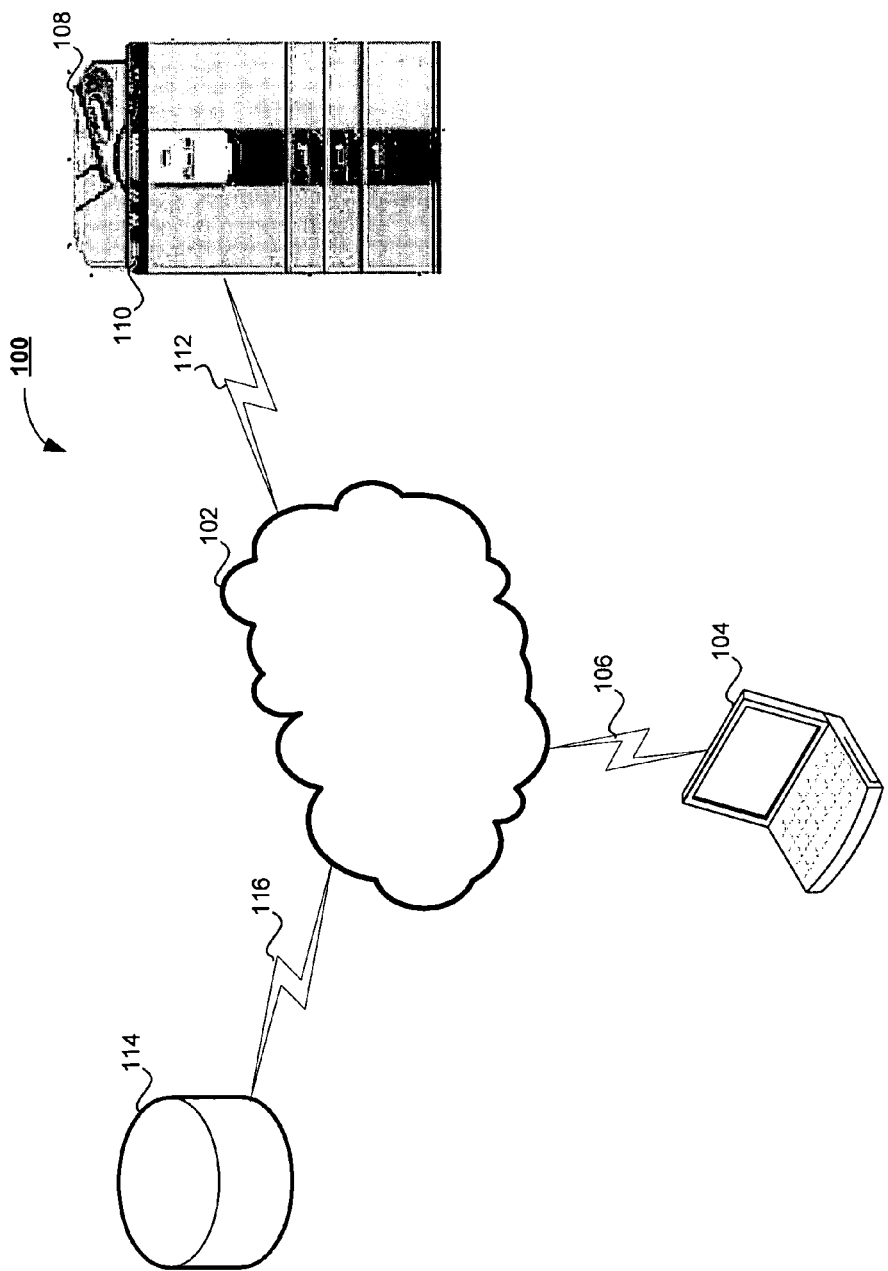
FIG. 1 is a block diagram illustrative of the system of the present invention.

Turning now to FIG. 1, there is shown a system 100 in accordance with the present invention. As shown in FIG. 1, the system 100 suitably includes a computer network 102. As will be understood by those skilled in the art, the computer network 102 is any suitable computer network capable of transporting data communications between electronic devices. Suitable networks include Ethernet, Token Ring, the Internet, and the like. In the preferred embodiment, the present invention is employed over a corporate, or local area network. The skilled artisan will appreciate that the present invention is equally capable of being employed on a wide area network, a wireless local area network, the Internet, and the like. In one embodiment, the computer network 102 is suitably equipped with administratively-enabled security protocols, such as unique user identification/password combinations, to control access to the computer network 102 and any associated electronic devices connected thereto.

The system 100 further includes a client device 104, illustrated in FIG. 1 as a laptop computer. As will be appreciated by those skilled in the art, the personal computer is for example purposes only and any personal electronic device, including, without limitation, a personal data assistant, a desktop computer, a smart phone, a cellular-based personal electronic device, a web-based personal electronic device, and the like, are equally capable of being employed by the system 100 of the present invention. In one embodiment, the client device 104 is communicatively coupled to the computer network 104 via a communications link 106. It will be understood by those skilled in the art that suitable communications links include, without limitation, wireless communications, such as 802.11-based protocols, wired communications, such as Ethernet, modem, and the like, infrared, serial, USB, Firewire, and the like. In the preferred embodiment, the client device 104 suitably includes a processor, storage device, memory, and communications device suitably adapted to employ an operating system as are known in the art. For example, the client device 104 advantageously employs a Microsoft® or Apple® based operating system. Other operating systems capable of secure data communications are equally capable of being employed by the present invention, without departing therefrom.

In the preferred embodiment of the present invention, the operating system of the client device 104 suitably includes one or more file access security measures, as will be known in the art. Thus, the client device 104 is advantageously equipped, via the operating system, to securely store one or more electronic files, such as a password. Preferably, the user of the client device 104 is required to login to the device 104 prior to accessing the computer network 102 of the present invention. It will be appreciated by those skilled in the art that while a single client device 104 is shown in FIG. 1, the present invention is not limited to a single device, but rather is capable of accommodating a plurality of client devices. In accordance with the present invention, the client device 104 is further equipped to communicate with other devices on the computer network 102, illustrated in FIG. 1 as the document processing device 108 and the central storage location 114.

As shown in FIG. 1, the system 100 further includes a document processing device 108 communicatively coupled to the computer network 102. Further in accordance with the present invention, a user, represented in FIG. 1 as the client device 104, or a system administrator (not shown), is provided access to the document processing device 108. It will be appreciated by those skilled in the art the document processing device 108 is advantageously represented in FIG. 1 as a multifunction peripheral device, suitably adapted to provide a variety of document processing services, such as, for example and without limitation, scanning, copying, facsimile, printing, and the like. Suitable commercially available image generating devices include, but are not limited to, the Toshiba e-Studio Series Controller. In a preferred embodiment of the present invention, the document processing device 108 includes a user-interface 110, enabling direct input of information to the document processing device 108. As will be appreciated by those skilled in the art, the user-interface 110 is any suitable input/output display device enabling receipt of the instructions and display of messages, including, for example and without limitation, a touchscreen display, an LCD display and corresponding alpha-numeric keypad, function-specific keypad and the like. In accordance with the present invention, the user-interface 110 is suitably adapted to receive user input in the form of a password, smart card, and the like, so as to enable confidential and secure printing. It will be appreciated by those skilled in the art that a document processing device is used for example purposes only, and the present invention is not limited solely to application to multifunction peripheral devices. For example, a server is equally capable of employing the subject invention in place of the document processing device 108, so as to enable secure storage of image data and the like.

The document processing device 108 is suitably equipped to send and receive data via the computer network 102 over a suitable communications channel 112. As will be understood by those skilled in the art, suitable communications channels include, but are not limited to, 802.11-based, cellular-based, local area network, wide area network, Internet, telephonic, infrared, and the like. In accordance with the present invention, the document processing device 108 is suitably adapted to receive image data, such as an electronic document and the like, via the computer network 102 over the communications link 112. Further in accordance with the present invention, the document processing device 108 also includes various components (not shown) including, without limitation a processor, memory, storage, communications, and the like. In one embodiment, the document processing device 108 is suitably equipped to receive a plurality of portable storage media, including without limitation, Firewire, USB, SD, MMC, XD, Compact Flash, Memory Stick, and the like.

The system 100 of the present invention further includes a central storage location 114, suitably adapted to store a plurality of data files, including, without limitation, portions of passwords, as will be explained in greater detail below. In the preferred embodiment, the central storage location 114 is any mass data storage device known in the art, for example an integrated magnetic hard drive or other dynamic or static memory storage device, e.g., flash memory. As shown in FIG. 1, the central storage location 114 is in data communication with the computer network 102 via the communications link 116. It will be understood by those skilled in the art that the communications link 116 is any suitable communications channel enabling the exchange of data between two electronic devices. For example, and without limitation, suitable communications links include wireless communication channels, such as 802.11(x), infrared, cellular, Bluetooth, and wired communication channels, as known in the art.

In operation, the client device 104 receives, from a system administrator, a user identification and/or password enabling the client device 104 to log onto the computer network 102. As will be understood by those skilled in the art, the methods for procuring a user identification and corresponding password vary, depending upon the type of computer network and the operating system of the client devices and associated peripheral devices. For example, the present invention is capable of employing Kerberos, Active Directory, or any other authentication mechanism known in the art. Thus, the skilled artisan will appreciate that in accordance with the present invention, the user identification and/or password are unique to the user, and preferably, to the client device 104. In accordance with the present invention, when the client device 104 belongs to a Windows® domain, or other similar domain, the user is prompted to download a print client from a network server or the document processing device 108 itself. The print client preferably has an embedded certificate/public key corresponding to the document processing device 108. As will be understood by those skilled in the art, when multiple document processing devices are available on the computer network 102, multiple certificates/public keys are downloaded to the client device 104, corresponding to each document processing device resident on the network 102. During this print client installation, a public key/private key pair is also generated for the user of the client device 104. To ensure security of the private key, which is stored on the client device 104, a suitable password encryption key is generated by the client device 104 and used to encrypt the private key on the device 104.

To initiate a secure document processing operation on the document processing device 108, the user selects the appropriate function via the print client of the client device 104. When this represents the first instance of secure document processing, the client device 104 public key is also sent, along with the document processing request, to the document processing device 108, which suitably functions as an internal certificate authority, wherein it is signed by the document processing device 108 private key to generate a default certificate. This default certificate is published in the document processing device 108 directory server. In one embodiment, the certificate authority is suitably configured such that only an administrator is capable of issuing the default certificate. Once the document processing request has been sent to the document processing device 108, the user is prompted to authenticate using the same login information required by the Windows® domain. The document processing device 108 then retrieves the key by which the data was encrypted, decrypts the document data contained within the document processing request, and performs the selected operation. It will be appreciated by those skilled in the art that the directory server of the document processing device 108 is advantageously capable of functioning not only to store the user's public keys/certificates, but also to store any optional security and policy information relating to the document and/or the users who are allowed to access it. The foregoing explanation of the functioning of the system 100 will better be understood in conjunction with the flowcharts illustrated in FIGS. 2, 3 and 4, discussed infra.

Figure 2:
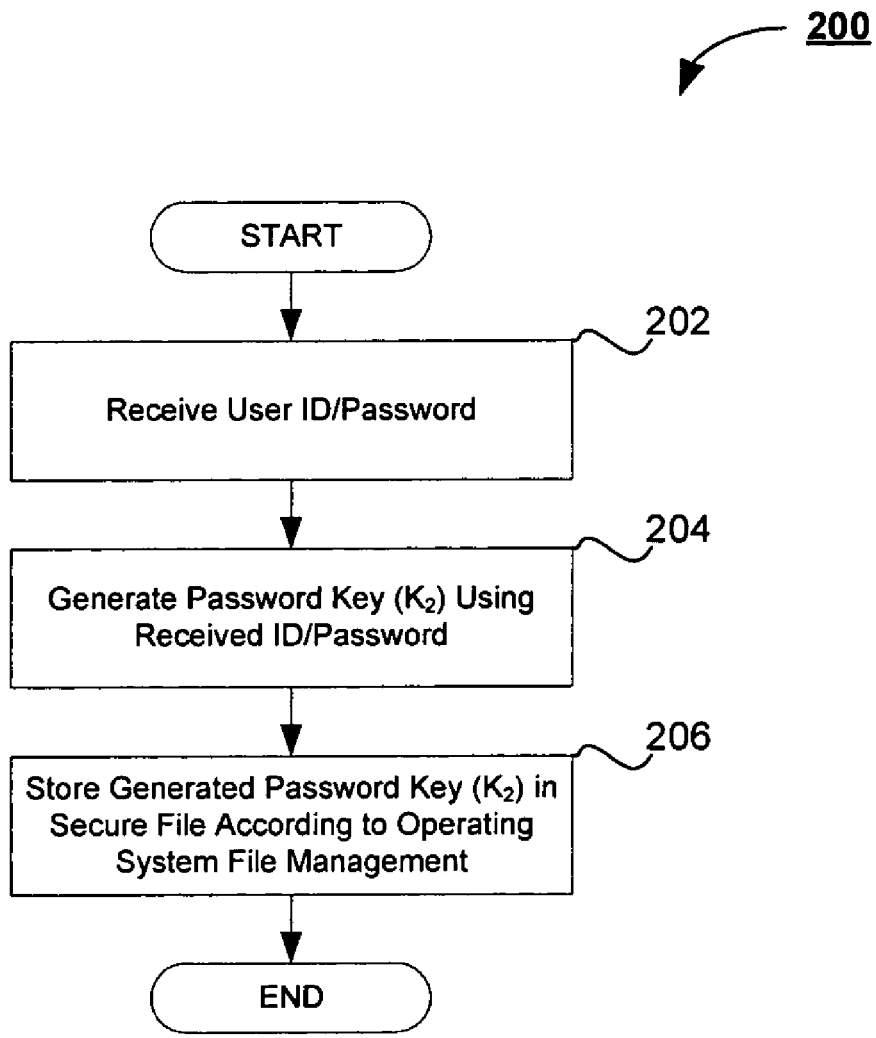
FIG. 2 is a flowchart illustrating a key generation process according to the present invention.

With respect to the discussion of FIGS. 2, 3, and 4, the following symbols are used for various keys, discussed in detail below:

($K_1$)—random symmetric key
($K_2$)—password key
($K_3$)—document processing device public key
($K_4$)—user private key
($K_5$)—user public key
($K_6$)—document processing device private key Turning now to FIG. 2, there is shown a flowchart 200 illustrating the generation of a password key in accordance with the present invention. As shown in FIG. 2, the method begins at step 202 with the client device 104 receiving a unique user identification/password combination. It will be understood by those skilled in the art that the user identification/password is preferably the same as that which the user inputs to log onto the domain. Following the receipt of the appropriate password, flow proceeds to step 204, wherein the client device 104 generates a password key ($K_2$) using the received identification and password. The password key ($K_2$) is then stored at step 206 in a secure file in accordance with the file management of the client device 104 operating system. The relevance of the password key ($K_2$) will be explained more fully during the encryption of image data in accordance with FIG. 3 and the decryption of image data in accordance with FIG. 4.

Figure 3:
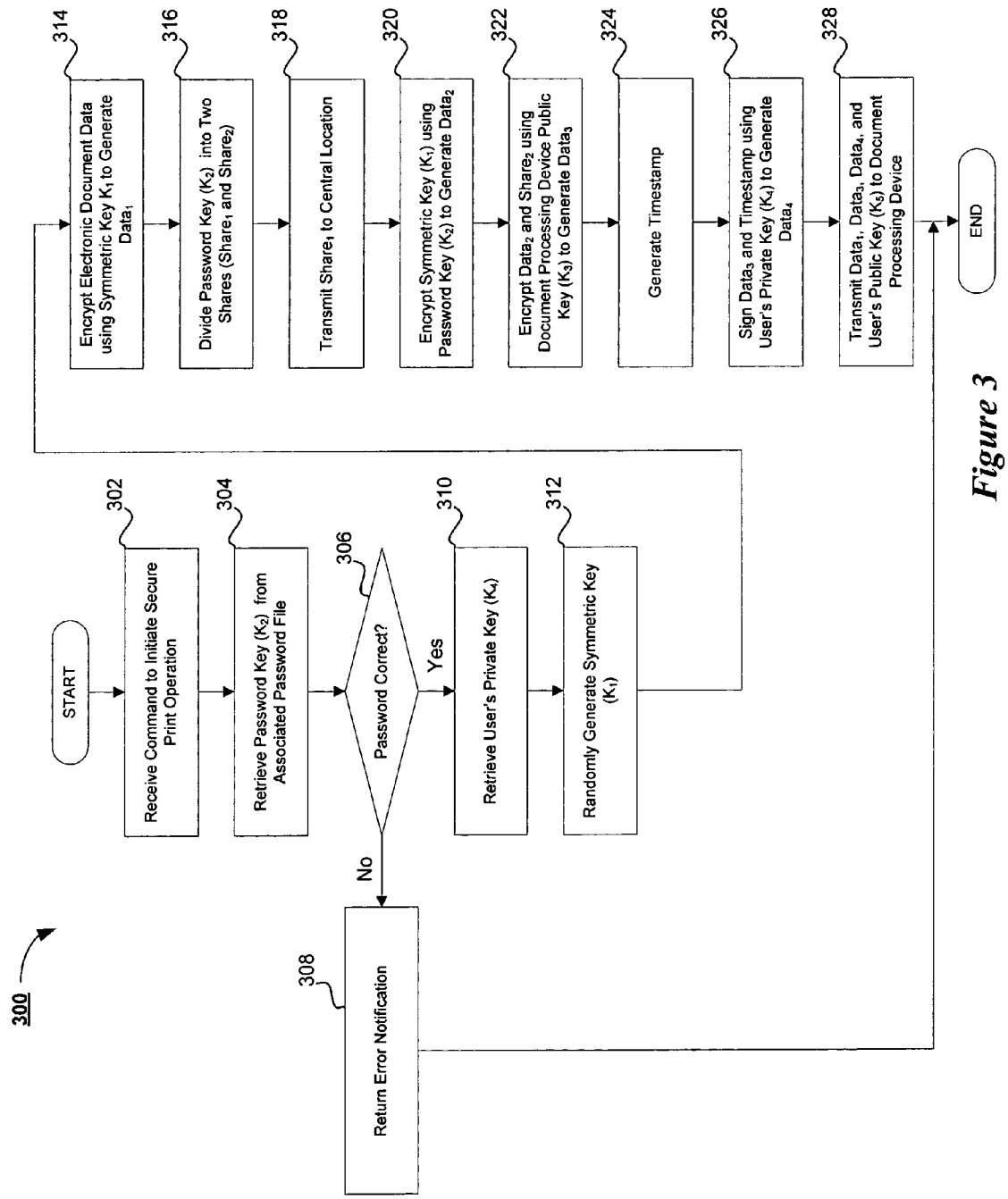
FIG. 3 is a flowchart illustrating a client side method according to the present invention.

Referring now to FIG. 3, there is shown a flowchart 300 illustrating an encryption method in accordance with the present invention. The method for encrypting a document of FIG. 3 begins at step 302, wherein the print client of the client device 104 receives a command to initiate a secure document processing operation. Following the secure processing command, flow proceeds to step 304, wherein the print client retrieves the password key ($K_2$) from the associated password file stored on the client device 104. Verification of the user's password is then determined at step 306. It will be understood by those skilled in the art that access to the password key ($K_2$) is secured using the operating system provided file access controls. Thus, the password key ($K_2$) is only accessible to the user who has installed the client driver and the system administrator. When verification fails at step 306, flow proceeds to step 308, wherein an error notification is returned to the user and the process terminates.

Upon successful verification, flow proceeds to step 310, wherein the user's private key ($K_4$) is retrieved from the associated password file. Similar to the password key ($K_2$), access to the private key ($K_4$) is secured using the operating system provided file access controls. Therefore, like the password key ($K_2$), the user's private key ($K_4$) is only accessible to the user who has installed the client driver and the system administrator. The print client then generates, at step 312, a random symmetric key ($K_1$).

At step 314, the electronic document data corresponding to the document processing request, is then encrypted using the random symmetric key ($K_1$), represented by the following equation, where E denotes encryption and the subscript denotes the key used to encrypt:

$$E_{K1}(\text{Data}) = \text{Data}_1.$$

Following encryption of $Data_1$, flow proceeds to step 316, wherein the password key ($K_2$) is divided into two (2) shares, $Share_1$ and $Share_2$. In the preferred embodiment, the password key ($K_2$) is divided using Shamir's Secret Sharing Scheme. Those skilled in the art will appreciate that the present invention is not limited to using Shamir's Secret Sharing Scheme and that the method described herein is capable of employing any variation of a similar Secret Splitting Scheme known in the art. Following the splitting of the password key ($K_2$), the first share, $Share_1$, is submitted to the central location 114 for storage thereon at step 318.

Next, the randomly generated symmetric key ($K_1$) is then encrypted at step 320 using the password key ($K_2$) to generate an encrypted symmetric key $Data_2$, represented by the equation:

$$E_{K2}(K_1)=Data_2.$$

$Data_2$ and $Share_2$ are then encrypted at step 322 using the document processing device 106 public key ($K_3$) to generate $Data_3$, represented by the equation:

$$E_{K3}(Data_2+Share_2)=Data_3.$$

It will be appreciated by those skilled in the art that the foregoing encryption is suitably adapted to protect communication from the client device 104 to the document processing device 108 and thereby ensures that only the document processing device 108 is able to decrypt the internal key data. At step 324, the print client then generates timestamp data corresponding to the document processing request. At step 326, the $Data_3$ and timestamp are digitally signed using the user's private key ($K_4$) to generate $Data_4$, represented by the equation:

$$SIGN_{K4}(Data_3+Timestamp)=Data_4$$

The $Data_1$, $Data_3$, $Data_4$, and the user's public key ($K_5$) are then hashed at step 328, to maintain message integrity and transmitted to the document processing device 108. Preferably, the message sent to the document processing device 108 further includes a timestamp, which provides information about when the operation was carried out. The message, i.e., the document processing request, transmitted to the document processing device 108, is represented by the following:

$$Data_1+Data_3+Data_4+K_5+Timestamp=message.$$

Figure 4:
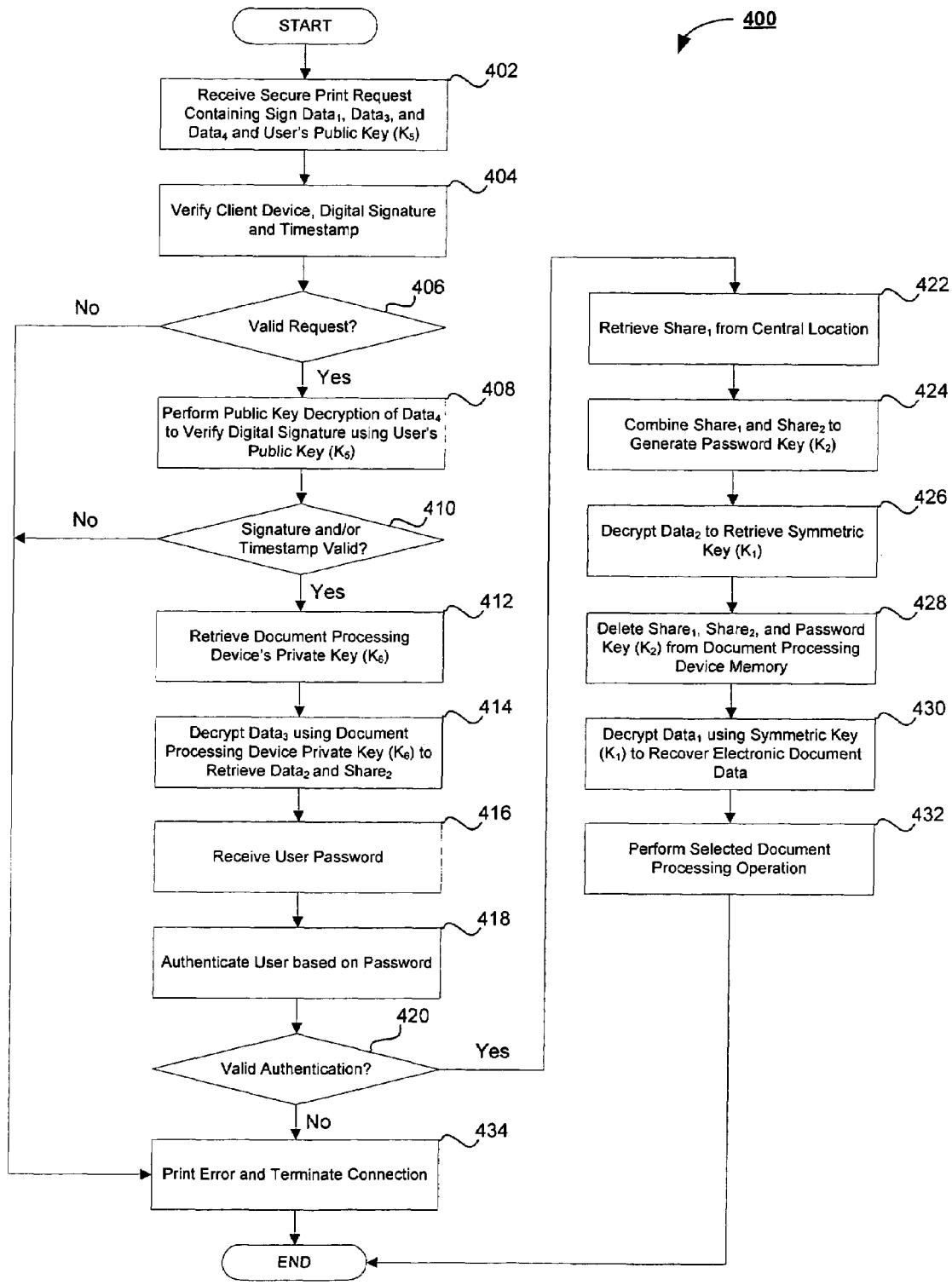
FIG. 4 is a flowchart illustrating a server side method according to the present invention.

Turning now to FIG. 4, there is shown a flowchart 400 illustrating the decryption method in accordance with the present invention. As will be understood by those skilled in the art, the decryption illustrated in flowchart 400 is suitably performed by the document processing device 108, or alternatively, a server with respect to the client device 104. Beginning at step 402, the document processing device 108 receives a secure document processing request comprising the $Data_1$, $Data_3$, $Data_4$, the user's public key ($K_5$), and a timestamp. Represented as the following equation:

$$message=Data_1+Data_3+Data_4+K_5+Timestamp.$$

At step 404, the document processing device verifies the client device, the user certificate/public key ($K_5$), and the timestamp. The preceding data is then used at step 406 to determine whether the received request is a valid request. Thus, the document processing device 108 suitably determines whether the document processing request was sent by an unknown client, or a client whose certificate/authority has been revoked, cancelled, or expired. When it is determined at step 406 that request is not valid, flow proceeds to step 434, wherein a print error has occurred and the connection is terminated.

When it is determined at step 406 that the received secure document processing request is a valid request, flow proceeds to step 408, wherein a public key decryption is performed on $Data_4$ to verify the digital signature using the user's public key ($K_4$), illustrated by the following equation, where D denotes decryption and the subscript denotes the key used to decrypt:

$$D_{K5}(Data_4)=SIGN+Data_3+Timestamp.$$

Validation of the signature and/or timestamp contained in $Data_4$ is then made at step 410. It will be appreciated by those skilled in the art that the validation performed at step 410 enables the document processing device 108 to double-check the validity of the received secure document processing request. A negative determination at step 410 prompts a print error and the connection is terminated. A positive determination at step 410 prompts the document processing device 108 to retrieve, at step 412, the document processing device 108 private key ($K_6$). $Data_3$ is then decrypted using the document processing device 108 private key ($K_6$) to retrieve $Data_2$ and $Share_2$ at step 414. The decryption of $Data_3$ is suitably represented by the following equation:

$$D_{K6}(Data_3)=Data_2+Share_2;$$

the skilled artisan will appreciate that at step 322, $Data_2$ and $Share_2$ were suitably encrypted using the document processing device 108 public key ($K_3$) and that step 414 is the decryption of the encryption performed at step 322.

The document processing device 108 then waits for user intervention at the user interface 110 at step 416. It will be appreciated by those skilled in the art that to secure the document data from unauthorized or undesired viewing, the requested document processing operation is not performed until the user is present to maintain the security of his document. Upon input of the user's password at step 416, flow proceeds to step 418, wherein the user is authenticated based upon the input password. In the preferred embodiment, authentication is accomplished by authenticating the user input password against the data contained in the active directory, which enables the document processing device to access the user's directory server account, e.g., the user's account stored on the central storage location 114. In an alternate embodiment, the input user password is used to bypass retrieval of the $Share_1$ by generating a hash, which is then used to generate the password key ($K_2$). When the authentication is not valid, i.e., incorrect or expired password, flow proceeds to step 434, wherein an error is returned and the connection is terminated.

When the authentication is valid at step 420, flow proceeds to step 422, wherein the document processing device 108 retrieves $Share_1$ from the central location 114, i.e., a directory server. The password key ($K_2$) is then generated by combining $Share_1$, retrieved from the central location 114, and $Share_2$, decrypted from $Data_3$ at step 424. $Data_2$ is then decrypted at step 426 using the password key ($K_2$) to retrieve the random symmetric key ($K_1$), illustrated by the following equation:

$$D_{K2}(Data_2)=K_1.$$

Following decryption of the random symmetric key ($K_1$), $Share_1$, $Share_2$, and the password key ($K_2$) are deleted from the document processing device 108 memory at step 428. It will be appreciated by those skilled in the art that the deletion of $Share_1$, $Share_2$, and the password key ($K_2$) functions to maintain the security of the password key and prevent unauthorized use of the key by subsequent users of the document processing device. The document processing device 108 then, at step 430, decrypts Data1 using the symmetric key ($K_1$) to retrieve the electronic document data. Once the document processing device 108 has decrypted the electronic document data, the selected document processing operation is performed at step 432.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system for secure communication of electronic document data on a network comprising:

means for receiving user identification data associate with an identity of a user of document processing devices on an associated network;

password key generator means for generating data representative of a password key from the user identification data;

means for dividing the password key into first and second shares;

means for communicating the first share to an associated storage area disposed in a trusted, commonly accessible repository;

means for receiving data representative of an electronic document;

encryption key generator means for randomly generating an encryption key;

means for encrypting the encryption key with the password key;

encryption means for encrypting the electronic document in accordance with the encryption key so as to generate an encrypted electronic document;

means for appending the second share to the encrypted electronic document; and means for communicating the encrypted electronic document and the appended second share to an associated document processing device;

means for receiving the encrypted electronic document and appended second share into the document processing device;

means for isolating the second share from the encrypted electronic document via the document processing device;

means for receiving into the document processing device, the first share from the repository;

means for conjoining the first share and the second share via the document processing device to reconstruct the password key;

means for decrypting the encryption key via the document processing device in accordance with the reconstructed password key; and means for decrypting the electronic document via the document processing device in accordance with the decrypted encryption key.

2. The system for secure transmission communication of electronic document data on a network of claim 1 wherein the encryption key generator means includes:

means for receiving the password key;

means for receiving data representative of a randomly generated encryption key; and means for generating the encryption key from the password key and the randomly generated encryption key.

3. The system for secure communication of electronic document data on a network of claim 2 wherein the password generator means includes means for generating the password key in connection with a data key associated with the associated document processing device.

4. The system for secure communication of electronic document data on a network of claim 3, further comprising:

means for retrieving data representative of a private key associated with the document processing device;

means for decrypting the encrypted electronic document in connection with the reconstructed password key and the data key associated with the associated document processing device; and means for commencing a document processing operation on a decrypted electronic document.

5. A method for secure communication of electronic document data on a network comprising the steps of:

receiving user identification data associate with an identity of a user of document processing devices on an associated network;

generating data representative of a password key from the user identification data;

dividing the password key into first and second shares;

communicating the first share to an associated storage area disposed in a trusted, commonly accessible repository;

receiving data representative of an electronic document;

randomly generating an encryption key;

encrypting the encryption key with the password key;

encrypting the electronic document in accordance with the encryption key so as to generate an encrypted electronic document;

appending the second share to the encrypted electronic document;

communicating the encrypted electronic document and the appended second share to an associated document processing device;

receiving the encrypted electronic document and appended second share into the document processing device;

isolating the second share from the encrypted electronic document via the document processing device;

receiving, into the document processing device, the first share from the repository; conjoining the first share and the second share via the document processing device to reconstruct the password key;

decrypting the encryption key via the document processing device in accordance with the reconstructed password key; and decrypting the electronic document via the document processing device in accordance with the decrypted encryption key.

6. The method for secure communication of electronic document data on a network of claim 5 wherein the step of generating an encryption key further comprises the steps of:
receiving the password key;
receiving data representative of a randomly generated encryption key; and
generating the encryption key from the password key and the randomly generated encryption key.

7. The method for secure communication of electronic document data on a network of claim 6, further comprising the step of generating the password key in connection with a data key associated with the associated document processing device.

8. The method for secure communication of electronic document data on a network of claim 7, further comprising the steps of
retrieving data representative of a private key associated with the document processing device;
decrypting the encrypted electronic document in connection with the reconstructed password key and the data key associated with the associated document processing device; and
commencing a document processing operation on a decrypted electronic document.

9. Computer-readable instructions stored on a data storage medium for secure communication of electronic document data on a network comprising:
instructions for receiving user identification data associate with an identity of a user of document processing devices on an associated network;
instructions for generating data representative of a password key from the user identification data;
dividing the password key into first and second shares;
instructions for communicating the first share to an associated storage area disposed in a trusted, commonly accessible repository;
instructions for receiving data representative of an electronic document;
instructions for randomly generating an encryption key;
instructions for encrypting the encryption key with the password key;
instructions for encrypting the electronic document in accordance with the encryption key so as to generate an encrypted electronic document;
instructions for appending the second share to the encrypted electronic document;
instructions for communicating the encrypted electronic document and the appended second share to an associated document processing device;
instructions for receiving the encrypted electronic document and appended second share into the document processing device;
instructions for isolating the second share from the encrypted electronic document via the document processing device;
instructions for receiving, into the document processing device, the first share from the repository;
instructions for conjoining the first share and the second share via the document processing device to reconstruct the password key;
instructions for decrypting the encryption key via the document processing device in accordance with the reconstructed password key; and
instructions for decrypting the electronic document via the document processing device in accordance with the decrypted encryption key.

10. The computer-readable instructions stored on a data storage medium for secure communication of electronic document data on a network of claim 9 wherein the instructions for generating an encryption key further comprises:
instructions for receiving the password key;
instructions for receiving data representative of a randomly generated encryption key; and
instructions for generating the encryption key from the password key and the randomly generated encryption key.

11. The computer-readable instructions stored on a data storage medium for secure communication of electronic document data on a network of claim 10, further comprising instructions for generating the password key in connection with a peripheral data key associated with the associated document processing device.

12. The computer-readable instructions stored on a data storage medium for secure communication of electronic document data on a network of claim 11, further comprising:
instructions for retrieving data representative of a private key associated with the document processing device;
instructions for decrypting the encrypted electronic document in connection with the reconstructed password key and the data key associated with the document processing device; and
instructions for commencing a document processing operation on a decrypted electronic document.

* * * * *

UNITED STATES PATENT AND TRADEMARK OFFICE
CERTIFICATE OF CORRECTION

PATENT NO. : 7,587,045 B2  Page 1 of 1
APPLICATION NO. : 11/242235
DATED : September 8, 2009
INVENTOR(S) : Michael Yeung, Sameer Yami and Amir Shahindoust It is certified that error appears in the above-identified patent and that said Letters Patent is hereby corrected as shown below:

In Claim 1, Column 9, Line 55, please replace "means for receiving user identification data associate with" with --means for receiving user identification data associated with--.

In Claim 5, Column 10, Line 56, please replace "receiving user identification data associate with an identity" with --receiving user identification data associated with an identity--.

In Claim 8, Column 11, Line 38, please replace "the steps of" with --the steps of:--.

In Claim 9, Column 11, Line 50, please replace "instructions for receiving user identification data associate" with --instructions for receiving user identification data associated--.

Signed and Sealed this

Thirteenth Day of October, 2009

David J. Kappos
*Director of the United States Patent and Trademark Office*